Patented Mar. 31, 1942

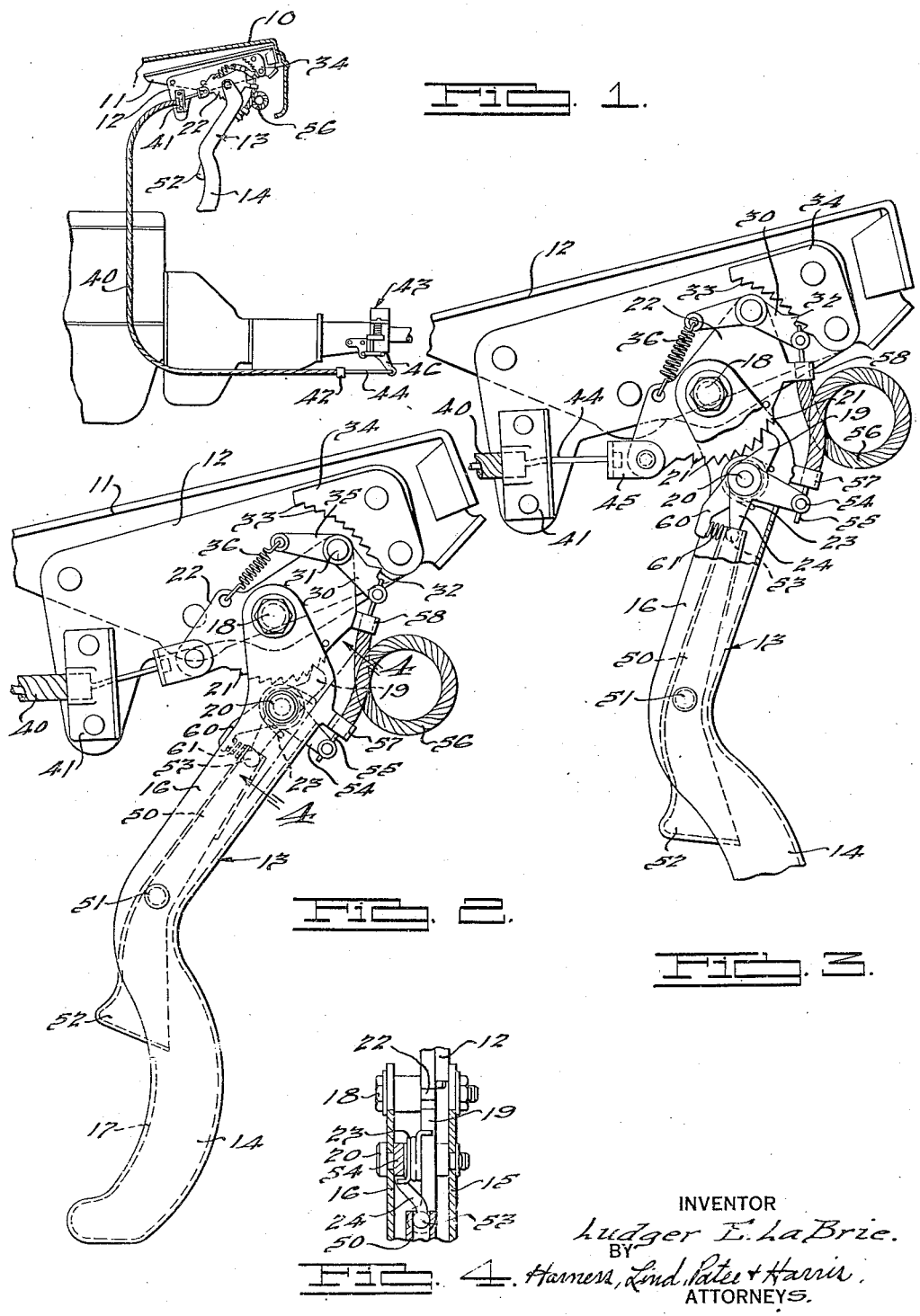

2,277,767

UNITED STATES PATENT OFFICE 2,277,767

EMERGENCY BRAKE CONTROL

Ludger E. La Brie, Detroit, Mich., assignor to Chrysler Corporation, Highland Park, Mich., a corporation of Delaware Application December 2, 1940, Serial No. 368,151

9 Claims. (Cl. 74—537)

My present invention relates to brake controls for automotive vehicles and the like, and particularly comprises means whereby the brake may be more firmly set by the emergency brake lever than would be the case with an ordinary type of emergency brake. In particular, the invention comprises means whereby the brake lever may be moved through repeating strokes, each of which progressively advances a brake operating mechanism toward brake setting position, until no further movement thereof is possible.

It is the principal object of the present invention to provide a repeating stroke brake setting mechanism which is simple in construction and operation. In order to achieve this principal object of the invention, means are provided whereby the first stroke of the brake lever operates the brake setting merhanism to a certain degree, and successive strokes thereof operate the brake setting mechanism to a further degree, such means comprising first and second pawls actuated by movement of the brake lever, the first pawl being attached to the brake lever and operating a movable member upon which the second pawl is mounted. The first pawl, therefore, acts as the latch between the brake lever and the brake actuating mechanism, and the second pawl acts as a lock to hold the brake operating mechanism at the position to which it is moved by the first pawl.

A further object of the present invention is to provide means whereby a single grip piece or trigger may be actuated to release both pawls simultaneously, so that full release of the brake setting mechanism may be achieved by one releasing movement of the brake lever regardless of the number of times that the brake lever has been moved through brake setting strokes.

The objects and advantages of the present invention will be more readily apparent from a study of the following specification and accompanying drawing in which a preferred embodiment of the invention is set forth in the complete detail.

In the drawing, Fig. 1 discloses the brake control mechanism of the present invention mounted in the position of use beneath the dashboard of an automotive vehicle and connected to a brake setting mechanism;

Fig. 2 is an enlarged view in elevation of the brake control comprising the present invention, with the parts thereof in the position they would assume when the brakes are released;

Fig. 3 is a view similar to Fig. 2 but showing the parts in the position they would assume when the brakes have been set by moving the brake lever through one stroke, the parts being now ready to permit the movement of the brake lever through a succeeding stroke, if desired; and, Fig. 4 is a fragmentary sectional view taken substantially along line 4—4 of Fig. 2.

In Fig. 1 there is disclosed the dashboard 10 of an automotive vehicle having a structural brace 11 associated therewith upon which is mounted a bracket 12. The bracket 12 serves as the support for the mechanism comprising the present invention which includes a brake lever 13 having a hand grip portion 14. The brake lever is preferably formed of a sheet metal stamping and is substantially channel-shaped in cross section, one of the sides 15 and 16, or perhaps both, being extended at 17 to form the substantially tubular hand grip portion 14. The sides 15 and 16 extend upward beyond the terminus of the back portion in the shape of a clevis embracing the lower edge of the bracket 12, and the brake lever is pivotally attached to the bracket 12 by a pivot member 18 extending through the sides 15 and 16 and the bracket 12.

A first pawl means is mounted between the sides 15 and 16 of the brake lever at a short distance below the pivot member 18, said pawl means comprising a pawl 19 pivotally mounted by a pivot member 20. The forward end of the pawl 19 is provided with a detent adapted to engage the teeth 21 of a movable ratchet rack 22 pivoted upon the pivot member 18, the teeth 21 being located on an arc about the axis of the pivot member 18. When the detent of pawl 19 is engaged in the teeth 21, the movable ratchet rack 22 may be moved coextensively with the brake lever 13 in a counterclockwise direction about the pivot member 18. The pawl 19 is forced to engage the teeth 21 by a resilient member 23 comprising a coil spring looped about the pivot member 20 and having one end hooked over a lever 24 and the other end hooked over the pawl 19, the force of the spring being such as to cause the detent to engage teeth 21 but being of such magnitude that clockwise movement of the brake lever 13 relative to the movable ratchet rack 22 may be accomplished by permitting the pawl 19 to ride back over the teeth 21.

The movable ratchet rack 22 carries a second pawl means comprising a pawl 30 pivotally mounted at 31 and including a detent 32 adapted to engage the teeth 33 of a fixed ratchet rack 34 mounted upon bracket 12, the teeth 33 being also on an arc about pivot member 18. An extension 35 of pawl 30 is urged toward pivot member 18 by a spring 36 tensed between the end of extension 35 and a portion of movable ratchet rack 22, so that the detent 32 may ride over the teeth 33 when moved in a counterclockwise direction and may hold the movable ratchet rack 22 in the position to which it is advanced by the brake lever and the first pawl means.

By the use of the mechanism so far described, the movable ratchet rack may be advanced from the position shown in Fig. 2 to that shown in Fig. 3, whereupon the brake lever may be moved clockwise to cause the first pawl means to reengage the movable ratchet rack at a more advanced point, whereupon the brake lever may be moved counterclockwise to advance the detent 32 to a more advanced position if permitted by the brake setting mechanism.

The brake setting mechanism comprises a Bowden cable 40, the casing of which is anchored at one end in a clamp 41 on bracket 12 and at the other end in a suitable clamp 42 adjacent the brake motor 43 which may be of any suitable character for the purpose. The control wire 44 of the Bowden cable extends from a member 45 pivoted on the movable ratchet rack 22 to a lever 46 or other actuating member on the brake motor 43.

In order to release the brake control from the position in which it is shown in Fig. 3, there is provided a trigger 50 pivotally mounted in the brake lever at 51 and comprising a finger piece 52 above the tubular portion 14 of the brake lever. The other end of the trigger 50 is tubular and embraces a ball head 53 on the lever 24, so that movement of the grip portion 52 into the brake lever will result in clockwise movement of lever 24. A second lever 54 forms a bell crank with lever 24 and has the wire 55 of a Bowden cable 56 attached thereto. The opposite end of wire 55 is attached to pawl 30 adjacent the detent 32. The casing of the cable 56 is anchored adjacent lever 54 in an ear 57 on the brake lever 13 and is anchored at the opposite end in an ear 58 on movable ratchet rack 22 adjacent the end of pawl 30. The cable 56 is preferably of considerable length and looped between the ends thereof so that movement of brake lever 13 may be accommodated without disturbing pawl 30. Clockwise movement of lever 54 as controlled by trigger 50, however, will result in the release of detent 32 from the teeth 33 regardless of the relative position of the brake lever 13.

In order that the first and second pawl means may be released simultaneously, there is provided an extension 60 on the first pawl 19, which extension 60 terminates adjacent the meeting ends of trigger 50 and lever 24. The extension 60 could be maintained in contact with the trigger 50, but in order to prevent rattling there is preferably provided a compression spring 61 biased between the ends of the two members. The spring will always be under compression to a greater or lesser extent as the detent rides over teeth 21 but will be compressed to its greatest extent when trigger 50 is actuated and will then move the extension 60 so that pawl 19 is completely released simultaneously with the release of pawl 30. The spring 61 is mounted so as to be in opposition to the action of the resilient member 23 but is of less effect on the pawl 19 than the resilient member 23 until compressed by the actuation of trigger 50.

Having made the details and operation of the preferred embodiment, herein disclosed, clear to those skilled in the art, it should be apparent that modifications in detail and arrangement thereof may be achieved. All such modifications as come within the scope of the following claims are considered part of my invention.

I claim:

1. A repeating stroke emergency brake control comprising a pivoted brake lever, a movable, brake setting ratchet rack pivotally supported at the pivotal axis of said lever, first pawl means carried by said lever and operatively engageable with the teeth of said movable ratchet rack to move said movable ratchet rack toward brake setting position, a fixed ratchet rack disposed adjacent said movable ratchet rack, second pawl means carried by said movable ratchet rack and operatively engageable with the teeth of said fixed ratchet, releasing means for said second pawl means comprising a trigger mounted on said brake lever and a connection between said second pawl means and said trigger including a Bowden cable, the casing of which is anchored to said movable ratchet rack at one end and to said brake lever at the other end and looped therebetween so that movement of said brake lever may be accommodated without disturbing said second pawl means, and a resilient member forcing said first pawl means into engagement with said movable ratchet rack and permitting said first pawl means to ride back over the teeth of said movable ratchet rack so that said brake lever may be moved through repeating cycles each advancing said movable ratchet rack.

2. A repeating stroke emergency brake control comprising a brake lever, a bracket pivotally supporting said lever, a movable, brake setting ratchet rack pivotally supported on said bracket at the pivotal axis of said lever, first pawl means carried by said lever and operatively engageable with the teeth of said movable ratchet rack to move said movable ratchet rack toward brake setting position, a fixed ratchet rack mounted on said bracket, second pawl means carried by said movable ratchet rack and operatively engageable with the teeth of said fixed ratchet, releasing means for said second pawl means comprising a trigger mounted on said brake lever and a connection between said second pawl means and said trigger including a Bowden cable, the casing of which is anchored to said movable ratchet rack at one end and to said brake lever at the other end and looped therebetween so that movement of said brake lever may be accommodated without disturbing said second pawl means, and a resilient member forcing said first pawl means into engagement with said movable ratchet rack and permitting said first pawl means to ride back over the teeth of said movable ratchet rack so that said brake lever may be moved through repeating cycles each advancing said movable ratchet rack.

3. The structure set forth in claim 1 in which said second pawl means comprises a spring exerting force resiliently opposing the releasing movement of said trigger and said resilient member is biased in opposition to said spring but is of less effect on said trigger.

4. The structure set forth in claim 2 in which said second pawl means comprises a spring exerting force resiliently opposing the releasing movement of said trigger and said resilient member is biased in opposition to said spring but is of less effect on said trigger.

5. The structure set forth in claim 1 in which said first pawl means includes an extension arranged adjacent said trigger, and a compression spring is biased between said extension and said trigger in opposition to said resilient member but of less effect than said resilient member until compressed by movement of said trigger, whereby said first and second pawl means may be simultaneously released by said trigger.

6. The structure set forth in claim 2 in which said first pawl means includes an extension arranged adjacent said trigger, and a compression spring is biased between said extension and said trigger in opposition to said resilient member but of less effect than said resilient member until compressed by movement of said trigger, whereby said first and second pawl means may be simultaneously released by said trigger.

7. A repeating stroke emergency brake control comprising a pivoted brake lever, a movable, brake setting ratchet rack pivotally supported at the pivotal axis of said lever, first pawl means carried by said lever and operatively engageable with the teeth of said movable ratchet rack to move said movable ratchet rack toward brake setting position, a fixed ratchet rack disposed adjacent said movable ratchet rack, second pawl means carried by said movable ratchet rack and operatively engageable with the teeth of said fixed ratchet, releasing means for said second pawl means comprising a trigger mounted on said brake lever and a connection between said second pawl means and said trigger including a Bowden cable, the casing of which is anchored to said movable ratchet rack at one end and to said brake lever at the other end, and a resilient member forcing said first pawl means into engagement with said movable ratchet rack and permitting said first pawl means to ride back over the teeth of said movable ratchet rack so that said brake lever may be moved through repeating cycles each advancing said movable ratchet rack.

8. A repeating stroke emergency brake control comprising a pivoted brake lever, a movable, brake setting ratchet rack pivotally supported at the pivotal axis of said lever, first pawl means carried by said lever and operatively engagable with the teeth of said movable ratchet rack to move said movable ratchet rack toward brake setting position, a fixed ratchet rack disposed adjacent said movable ratchet rack, second pawl means carried by said movable ratchet rack and operatively engageable with the teeth of said fixed ratchet, releasing means for said second pawl means comprising a trigger mounted on said brake lever and a connection between said second pawl means and said trigger including a Bowden cable, the casing of which is anchored to said movable ratchet rack at one end and to said brake lever at the other end, and a resilient member forcing said first pawl means into engagement with said movable ratchet rack and permitting said first pawl means to ride back over the teeth of said movable ratchet rack so that said brake lever may be moved through repeating cycles each advancing said movable ratchet rack, said second pawl means comprising a spring resiliently opposing releasing movement of said trigger, and said resilient member being biased in opposition to said spring and being of less effect on said trigger than said spring.

9. A repeating stroke emergency brake control comprising a pivoted brake lever, a movable, brake setting ratchet rack pivotally supported at the pivotal axis of said lever, first pawl means carried by said lever and operatively engageable with the teeth of said movable ratchet rack to move said movable ratchet rack toward brake setting position, a fixed ratchet rack disposed adjacent said movable ratchet rack, second pawl means carried by said movable ratchet rack and operatively engageable with the teeth of said fixed ratchet, releasing means for said second pawl means comprising a trigger mounted on said brake lever and a connection between said second pawl means and said trigger including a Bowden cable, the casing of which is anchored to said movable ratchet rack at one end and to said brake lever at the other end, and a resilient member forcing said first pawl means into engagement with said movable ratchet rack and permitting said first pawl means to ride back over the teeth of said movable ratchet rack so that said brake lever may be moved through repeating cycles each advancing said movable ratchet rack, said first pawl means including an extension arranged adjacent said trigger and a compression spring biased between said extension and said trigger in opposition to said resilient member but of less effect than said resilient member until compressed by movement of said trigger, whereby said first and second pawl means may be simultaneously released by said trigger.

LUDGER E. LA BRIE.